(No Model.)
D. H. HILL.
COMBINED CAR FENDER AND BRAKE MECHANISM.
No. 535,166.
Patented Mar. 5, 1895.
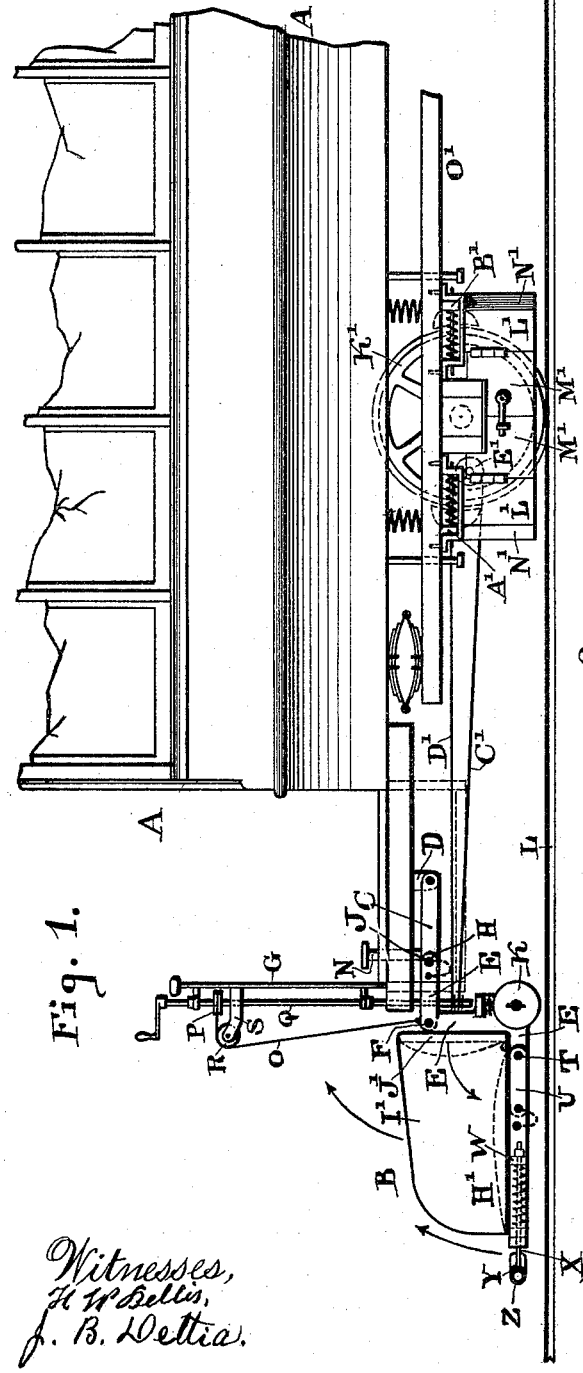
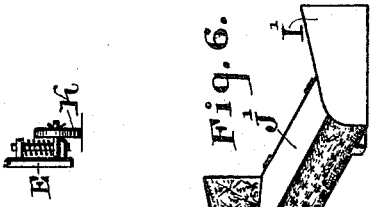
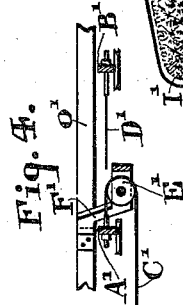
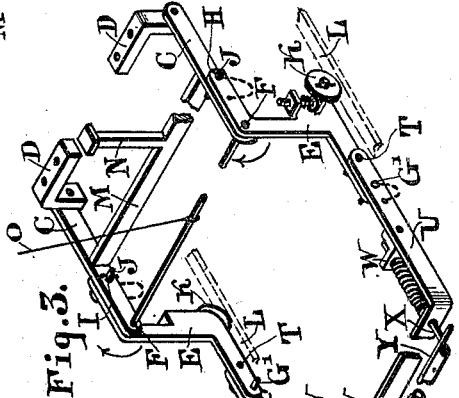
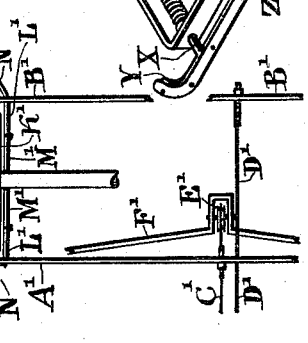
Witnesses,
Inventor
David H. Hill

UNITED STATES PATENT OFFICE.

DAVID HASTINGS HILL, OF PHILADELPHIA, PENNSYLVANIA.

COMBINED CAR FENDER AND BRAKE MECHANISM.

SPECIFICATION forming part of Letters Patent No. 535,166, dated March 5, 1895.

Application filed October 20, 1894. Serial No. 526,517. (No model.)

*To all whom it may concern:*

Be it known that I, DAVID HASTINGS HILL, a citizen of the United States, residing in Philadelphia, Pennsylvania, have invented a new and useful Improvement in a Combined Car Fender and Brake Operating Mechanism, the same being illustrated and described in the accompanying drawings and specification.

My invention relates to improvements in combined car fender and brake operating mechanism, whereby in the event of imminent danger the fender may be brought close to the ground, and the brakes operated or applied to the wheels of the car simultaneously with the lowering of the fender.

It also consists of means for inclosing the wheels of a car so that there can be no possibility of a person being injured by them.

Figure 1 represents a side elevation of the combined car fender and brake operating mechanism embodying my invention. Fig. 2 represents a plan view of a portion of the device. Fig. 3 represents a perspective view of a portion of the frame of the fender. Fig. 4 represents a vertical section of a portion of the device. Fig. 5 represents an end elevation of a portion of the device. Fig. 6 represents a perspective view of a seat used in connection with my invention.

Similar letters of reference indicate similar parts in the several figures.

Referring to the drawings: A designates a car and B designates a fender attached thereto. The latter consists of the arms C pivoted to hangers D which are rigidly secured to a suitable portion of the car A.

E designates J shaped levers pivoted to the arms C, as at F, to permit said levers to rotate on the arms C as indicated by arrows in Fig. 3, to permit the vertical and lower horizontal members of the levers E to be brought close to the dasher G of the car A so that the latter may be brought close to another car when placed in the stable and thereby take up no more room or space than is at present required.

Each upper horizontal member of the levers E has an opening H which registers with an opening I in the arm C to which the respective lever E is pivoted so that by inserting a pin J in each pair of openings H and I the levers E and respective arms C become interlocked and form substantially a rigid J shaped lever when the fender B is in operative position.

Each lever E carries a spring actuated roller K which may at times travel on the car tracks L so as to sustain a portion of the shock occasioned when a weight, (for instance, that of a person,) suddenly drops into the fender, each roller K being journaled in the lower portion of a rod which works in a guide on each of the levers E, each of said rods being encircled by a spring which normally keeps said rollers in their lowermost position relatively to the levers E.

The rollers K are normally a trifle above the car tracks but are permitted to come in contact with the latter when the fender B is about to receive a shock or when carrying a load.

The arms C are connected by a cross bar M formed with a raised portion N which may be operated by foot, or otherwise, to further depress the fender after the rollers K have come in contact with the car tracks L so that the space between the under side of the fender B and the ground will be so small that there can be no possibility of even a very small child being caught underneath the fender.

The arms C are connected by a cord, or its equivalent, O with a pulley P secured to the brake rod Q so that the fender B may be raised and lowered by rotating said rod Q, and thereby cause the rollers K to come in contact with the tracks L when danger of running over some one is anticipated, or retain the rollers K above the tracks L when no danger is foreseen.

The cord or its equivalent O is attached to the arms C by passing the free end of said cord, or its equivalent, through openings in said arms C and then securing, in any suitable manner, said free end to the main portion of the cord or its equivalent O. The cord O is passed over a pulley R, adjacent to the pulley P, and journaled in a bracket S secured to the dasher G.

Pivoted to each lever E as at T is an arm U and these latter are connected by a cross bar V for the purpose of strengthening said arms U.

The arms U may be rotated on their pivots T so that they may be folded against the dasher G when not in use. Each arm U has an opening which registers with an opening in its respective lever E so that when a pin G' is inserted in said openings the levers E and respective arms U are interlocked and form substantially a rigid extension to the horizontal lower limbs of the ⌐ shaped levers E and in connection with the cross piece V forms a frame to receive a seat or its equivalent H'. In the present instance the seat H' consists of fixed or rigid sides I' and a hinged back J' so that the latter may be closed, see Fig. 6 to permit the levers E to be rotated on their pivotal connections F so that the fender may be brought against the dasher G when not in use.

If desired the seat H' may be removed from its supporting frame, and the arms U rotated on their pivotal connections T so that the frame may be brought against the dasher G when the fender is not in use, and in this case the pins J need not be removed as no rotary motion is then required at the pivotal connections F.

The distance between the sides I' of the seat H' is somewhat greater than the width of the car A so as to permit the sides I' of the seat H' to pass the sides of the car A when the fender is rotated on its pivotal connections F and folded against the dasher G. In this case the pins G' need not be removed from the openings in the levers E and arms U since no rotation is then required at the pivotal connections T.

W designates angle irons or knee braces which are secured to the arms U and guided in said angle irons W and cross piece V are spring actuated rods X to which is secured a rod Y which carries a rubber hose or its equivalent Z, the object of which is to strike a person in such a manner as to knock the feet from under him or her, as the case may be, and cause the person struck to fall into the fender B and thereby escape injury. As the rubber hose Z is soft, and the spring actuated rods X yield when said hose strikes a person the danger of injury from a blow from said fender is reduced to a minimum.

A' and B' designate spring actuated brake beams guided on the truck of the car A and connected by chains or their equivalent C' and D' with the brake rod Q and wound around the same in reverse direction to that in which the cord O is wound on the pulley P, so that when the rod is rotated to operate the brakes, the fender B will be lowered and the rollers K permitted to come in contact with the car tracks L, and when so rotated as to throw off the brakes will cause the rollers K to be removed from said car tracks.

The chain C' passes around a pulley or its equivalent E' journaled in a cross bar F' secured to the truck of the car A.

The pulley or its equivalent E' may, if desired, be secured to any suitable portion of the car.

Each wheel K' of the car A is partly inclosed by a housing or guard L' with hinged doors or their equivalent M' so that access may be had to the interior of said housing or guard, the ends of which are preferably "V" shaped as at N'. Each housing or guard L' is, in the present instance, secured to the truck frame O' of the car A, but may be secured to other parts of the car if desired.

The operation is as follows: The fender B in its normal position is as shown in Fig. 1. When danger is anticipated the motorman or gripman rotates the brake rod Q so as to slacken the cord O which causes the fender to lower until the rollers K come in contact with the car tracks L, and then applies his foot to the raised portion N to further depress the fender so as to bring it very close to the ground. While the cord O is being slackened the chains C' and D' are being wound around the brake rod Q and thus draw the brake beams A' and B' toward each other and consequently bring the brake shoes firmly against the car wheels K'. Every time the brakes are applied to the wheels K' the fender B is lowered but the raised portion N need not be depressed except in the event of danger. When the car A is to be started again the brake rod Q is rotated so as to draw on the cord O and raise the fender B to its elevated position, and at the same time unwind the chains C' and D' so that the brake beams F' may return to their normal positions. When the car A is not in use and it is desired to bring the same close to another car the seat H' may be removed from the frame of the fender B, and the pins G' removed from the openings in the arms U and levers E and so permit the arms U to be rotated on their pivotal connections T and be brought against the dasher G. If desired the seat H' need not be removed from the frame of the fender B, but in this case the back J' of the seat must be lowered as shown in Fig. 6, and the pins J removed from the openings in the arms C and levers E. The levers E, with the arms U interlocked therewith, may then be rotated on their pivotal connections F so as to permit the seat H' and the frame which carries the same to be brought against the dasher G.

Having thus described my invention, what I claim as new, and desire to secure by Letters Patent, is—

1. In a combined car fender and brake operating mechanism, the arms C pivoted to the car A; the levers E pivoted to said arms; means for interlocking said arms and levers; a connection between said parts and the brake bar Q in combination with the brake mechanism substantially as shown and described.

2. In a combined car fender and brake operating mechanism the arms C pivoted to the car A; the levers E pivoted to said arms; means for interlocking said arms and levers; the arms U pivoted to the levers E and means for interlocking said arms U and levers E; a connection between said parts and the brake rod Q in combination with the brake mechanism substantially as shown and described.

3. In a combined car fender and brake operating mechanism the arms C pivoted to the car A; the levers E pivoted to said arms; means for interlocking said arms and levers; the arms U pivoted to the levers E; means for interlocking said arms U and levers E; a buffer, consisting of the rods X and Y and hose Z; a connection between said parts and the brake rod Q in combination with the brake mechanism, substantially as shown and described.

In testimony whereof I affix my signature in presence of two witnesses.

DAVID HASTINGS HILL.

Witnesses:
H. W. BELLIS,
J. B. DETTRA.